United States Patent
Mueller et al.

(10) Patent No.: US 9,011,010 B2
(45) Date of Patent: Apr. 21, 2015

(54) HYBRID WIND TURBINE BLADE BEARING

(75) Inventors: Thomas G. Mueller, Elk Grove Village, IL (US); Adam V. C. Reedman, Hoornaar (NL); Eric L. Brubaker, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/575,816

(22) PCT Filed: Feb. 4, 2011

(86) PCT No.: PCT/EP2011/000526
§ 371 (c)(1),
(2), (4) Date: Oct. 18, 2012

(87) PCT Pub. No.: WO2011/095349
PCT Pub. Date: Aug. 11, 2011

(65) Prior Publication Data
US 2013/0202232 A1    Aug. 8, 2013

(30) Foreign Application Priority Data
Feb. 5, 2010    (EP) .................. PCT/EP2010/000727

(51) Int. Cl.
*F16C 27/06*    (2006.01)
*F03D 11/00*    (2006.01)
*F03D 7/02*    (2006.01)

(52) U.S. Cl.
CPC .......... *F03D 11/0008* (2013.01); *F03D 7/0224* (2013.01); *F03D 7/0248* (2013.01); *F05B 2240/54* (2013.01); *F16C 27/063* (2013.01); *Y02E 10/723* (2013.01); *Y02E 10/722* (2013.01); *F16C 2360/31* (2013.01)

(58) Field of Classification Search
USPC .......................... 384/129, 195, 197, 215, 221; 267/141.2, 141.3; 188/265
See application file for complete search history.

(56) References Cited

U.S. PATENT DOCUMENTS

| | | | |
|---|---|---|---|
| 3,087,690 A * | 4/1963 | Doman et al. | 244/17.27 |
| 3,536,415 A | 10/1970 | Kusiak | |
| 3,759,631 A * | 9/1973 | Rybicki | 416/134 R |
| 4,298,313 A | 11/1981 | Hohenemser | |
| 5,271,678 A * | 12/1993 | Bourgeot | 384/221 |
| 7,097,169 B2 * | 8/2006 | Mueller | 384/221 |

FOREIGN PATENT DOCUMENTS

WO    WO2007006301 A1    1/2007
WO    WO2007112748 A2    10/2007

* cited by examiner

*Primary Examiner* — James Pilkington
(74) *Attorney, Agent, or Firm* — Bryan Peckjian; SKF USA Inc. Patent Dept.

(57) ABSTRACT

Wind turbine blade pitch bearing device (1) adapted for rotational support of a turbine blade (9), having a first bearing unit (4, 5) and a second bearing unit (6, 7) coaxial to the first bearing unit. The first bearing unit (4, 5) and the second bearing unit (6, 7) are of different bearing types. By using two different bearing types, one bearing can be optimized for small and quick rotations and the other type can be optimized for larger and slower rotations.

7 Claims, 2 Drawing Sheets

HYBRID WIND TURBINE BLADE BEARING

CROSS-REFERENCE

This application is the U.S. national stage of International Application No. PCT/EP2011/000526 filed on Feb. 4, 2011, which claims priority to International Application No. PCT/EP2010/000727 filed on Feb. 5, 2010, both of which are herein incorporated by reference.

TECHNICAL FIELD

The present invention relates to a bearing device adapted to be used for the pitch adjustment of a wind turbine blade.

BACKGROUND ART

Wind turbines are designed to convert wind into electricity, by turning a generator positioned in a wind turbine housing, also known as a nacelle. The rotation of the generator is achieved by wind turbine blades, normally three, that rotate by the wind. In order to be able to optimize the output power of the wind turbine, the blades may be rotated around their longitudinal axis. In this way, the blades can be used to control the amount of wind power transferred from the wind to the generator.

Normally, especially larger wind turbines are designed for a specific wind speed range. Below a predefined wind speed, the rotor will not rotate at all. The maximum power output may be designed to take place at around 15 m/s. The wind turbine may be equipped with a gear box in order to optimise the rotational speed of the generator. Most wind turbines are provided with a variable-speed turbine, which use a solid-state power converter to interface to the electrical transmission system. In this way, the energy can be collected regardless of the rotational speed, i.e. frequency, of the turbine.

At higher wind speed, the output power of the turbine must be limited. The rotation of the turbine may be limited by altering the blade angle. Normally, this is referred to as either stall control or pitch control.

In stall control, the angle at which the wind strikes the blades, i.e. angle of attack, is increased, which reduces the induced drag. A fully stalled turbine blade, when stopped, has the flat side of the blade facing directly into the wind. In pitch control, the angle of attack is decreased, which reduces the induced drag. A fully furled turbine blade, when stopped, has the edge of the blade facing into the wind.

Modern turbines all pitch the blades in high winds. Since pitching requires acting against the torque on the blade, it requires some form of pitch angle control, either hydraulic or electrical. The blade is attached to the rotor using a rotational bearing of some kind.

Normally, slewing bearings are used in order to be able to rotate the blade of a wind turbine. The blades may either be rotated at the same time with the same mechanism, or they may be individually rotatable. Such a bearing may be a roller bearing having a diameter in the same order as the outer diameter of the blade base. The bearing is exposed to several loads, both static and dynamic. The bearing must be preloaded and the preload must further be monitored in order to identify deviations that require a readjustment of the preload.

The adjustment of the blade pitch can be seen as an oscillation, since the blade is moved back and forth. The blade will thus never rotate continuously around the centre axis. The pitch movement can be divided into three ranges.

In the first range, the pitch angle is small, in the range of up to 5 degrees, and the pitching speed is high. In this range, each blade is adjusted individually in order to compensate each blade for small deviations in the wind. Such a deviation may occur when the lower blade passes the tower. The blade can also be pitched in order to compensate for predicted or measured wind shear or other turbulences. In this range, the blade may be rotated over the range of 5 degrees in around a second.

In the second range, the pitch angle is somewhat larger, in the range of up to 30 degrees, and the pitching speed is slow. In this range, the blades are usually adjusted collectively in order to compensate for deviations in the wind speed. In this range, the blade may be rotated over the range of 30 degrees in around ten seconds.

In the third range, the pitch angle is large, around 90 degrees, and is used to park the rotor when the wind speed is too high. In this range, the rotational speed is the same as in the second range. This position is also used to stop the rotor when there is a failure in one or more of the turbine components, in order to prevent further damage to the components and to allow for a repair.

Since the pitch movement of the blade can be seen as an oscillation, the design of normal slewing bearings are not optimal for this type of application. Together with the different types of load imposed on the bearing when mounted to a blade in a regular way, there is room for an improved wind turbine blade pitch bearing.

DISCLOSURE OF INVENTION

An object of the invention is therefore to provide an improved wind turbine blade pitch bearing device that is adapted for oscillating movements. A further object of the invention is to provide a wind turbine blade pitch bearing device that requires less maintenance. A further object of the invention is to provide a wind turbine blade pitch bearing device that is adapted to withstand an increased bending moment from the blade.

With a wind turbine blade pitch bearing device adapted for rotational support of a turbine blade, having a first bearing unit and a second bearing unit coaxial to the first bearing unit, the object of the invention is achieved in that the first bearing unit and the second bearing unit are of different types.

By this first embodiment of the bearing device according to the invention, a bearing device comprising two different bearing types is provided. This is advantageous in that one bearing type is optimized for small and quick oscillations and the other bearing type is optimized for larger and slower rotations. By optimizing the two bearing types for the different pitch oscillation cases of a wind turbine, the wear of the bearings can be reduced dramatically.

In a preferred embodiment, cylindrical elastomeric bearings are used for the small and quick pitch movements, i.e. oscillations, of a wind turbine blade. Several advantages are obtained. One advantage is that this type of bearing has a more or less unlimited life length since there is no wear induced on the bearing when used within its specifications. The bearing further does not require any maintenance. The bearing is stiff in the axial direction but will provide some damping since it comprises rubber. For a wind turbine blade, the quick rotational movements of the blade are very limited, normally up to 5 degrees, which resembles an oscillating movement. An elastomeric bearing is thus well suited for this type of movements.

Sliding surfaces are well adapted for larger angular movements having a low rotational speed. To adjust the blade to the wind speed, rotations of up to 30 degrees may be used, but with a slow rotational speed. When the blade is to be stalled, the blade is turned up to 90 degrees but the speed is also slow. Thus, in a preferred embodiment, plain bearings are used for this type of movement.

In a further development of the invention, two spaced-apart bearing units are used, which increases the ability to withstand high bending moments on the blade. Further, the design of the bearing device makes it possible to reach the bearing device from within the hub and blade, which means that the blade need not be dismounted during maintenance.

BRIEF DESCRIPTION OF DRAWINGS

The invention will be described in greater detail in the following, with reference to the embodiment shown in the attached drawing, where.

MODES FOR CARRYING OUT THE INVENTION

The embodiments of the invention with further developments described in the following are to be regarded only as examples and are in no way to limit the scope of the protection provided by the patent claims.

Figure 1:
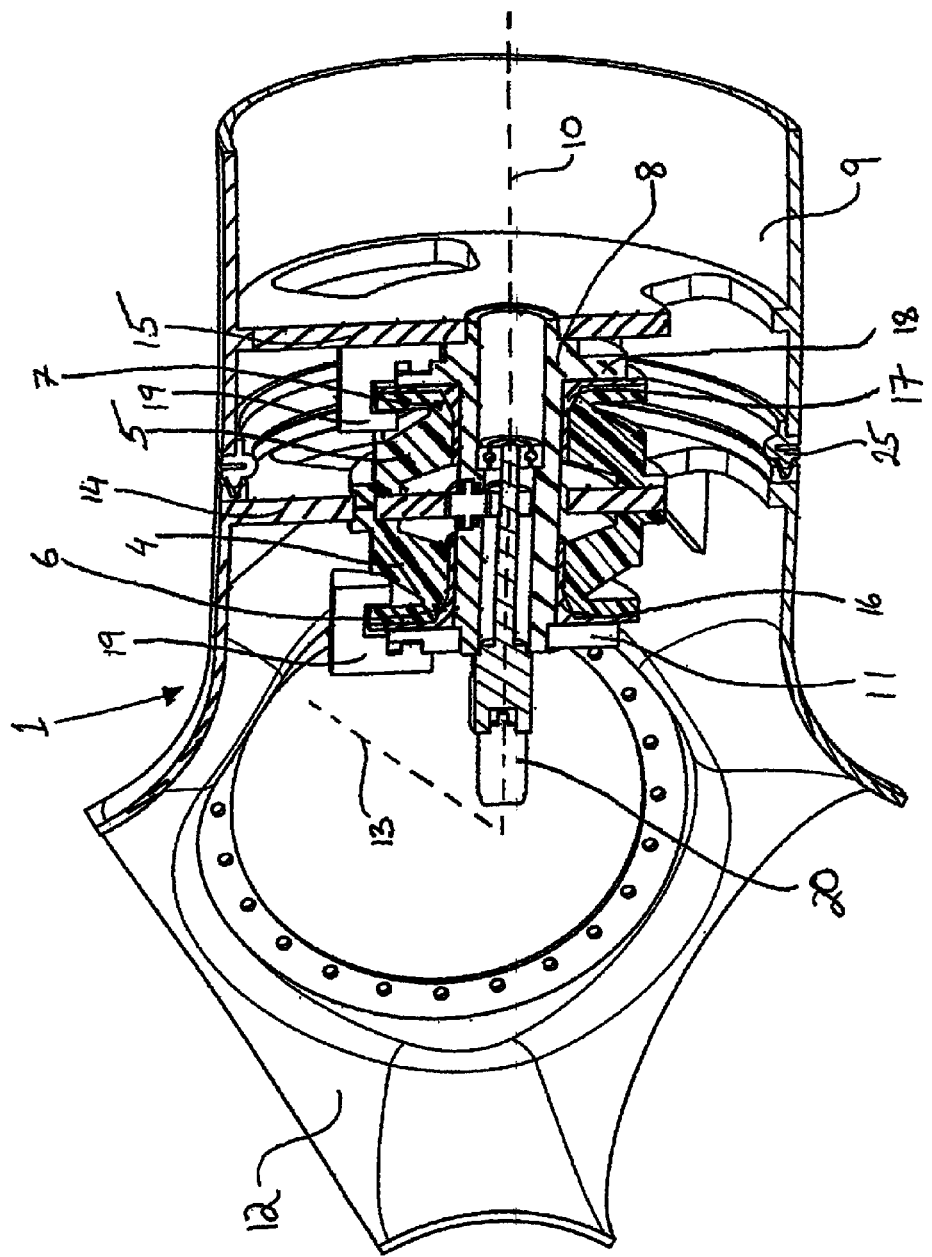
FIG. 1 shows a cut perspective view of a bearing device according to the invention mounted on a wind turbine hub.

FIG. 1 shows a first embodiment of a wind turbine blade pitch bearing device adapted for rotational support of a turbine blade. In the figure, the wind turbine hub is shown from the front of the wind turbine, with the main shaft axis 13 perpendicular to a rotational axis 10 of the bearing device. The generator of the wind turbine is centred on the main shaft axis. The rotor of the wind turbine will comprise the hub with, in the shown embodiment, three blades attached to it. In FIG. 1, the hub 12 is shown with (part of) one blade 9 attached.

On a conventional hub, a regular roller bearing is mounted to the hub close to the hub centre. The outer ring of the bearing is mounted to the hub with many bolts, typically 50 to 80 bolts, which are pre-tensioned according to specification. When the blade is assembled, it is mounted to the inner ring with a matching number of bolts that are also pre-tensioned according to specification. It is time-consuming and tedious work to fasten and adjust the bolts, especially since they need to be readjusted during maintenance. When the blade is mounted to the hub, a sealing is mounted in the gap between the hub and the blade in order to protect the bearing from the environment. There is however limited space for a proper sealing.

One drawback with a regular roller bearing is that the rollers have a relatively small contact area which gives a relatively high contact pressure between the rollers and the races. Such a bearing is designed for moderate rotational speeds and for continuous rotation. In those cases, they provide a very low friction. Another drawback is that a single overload event may result in the breakdown of the complete bearing. For a wind turbine, such an event may be an extremely high wind gust. If a few roller elements become damaged, the roller bearing will fail.

In the inventive bearing device, two different bearing types are used in order to obtain a bearing behaviour that is adapted for the pitch adjustments of a wind turbine blade. The adjustment of the blade pitch can be seen as an oscillation, since the blade is moved back and forth, and the angular range of movement may be divided into three different categories. In the first category, the pitch angle is up to 5 degrees with a relatively high pitching speed. In the second category, the pitch angle is up to 30 degrees with a relatively slow pitching speed. In the third category, the pitch angle is up to 90 degrees with the same rotational speed as for the second category.

The inventive bearing device thus comprises two different bearing types adapted for the different categories. A first bearing type is adapted for the first category, i.e. small oscillations with a relatively high oscillation speed. A second bearing type is adapted for the second and third category, i.e. larger rotations with a relatively low rotational speed. In the shown embodiment, the first bearing type is a cylindrical elastomeric bearing and the second bearing type is a plain bearing. Other bearing types may also be used for one or both of the bearings, depending on the design and/or the requirements of the wind turbine in which the bearings are used. It is e.g. possible to use elastomeric bearings for the first category and roller bearings for the second/third category, where the roller bearing is adapted for slow rotational speeds only. Another possibility would be to use two different types of plain bearings for the first and second/third category, where the material properties differ e.g. with respect to friction or durability.

The bearing device shown in FIG. 1 comprises a first bearing unit 4, 5 and a second bearing unit 6, 7 which rotatably support a shaft 8, to which the blade 9 is attached. The second bearing unit is located on the shaft 8, between the first bearing unit and the shaft. The first bearing unit 4, 5 will therefore be referred to as a radially outer unit and the second bearing unit 6, 7 will be referred to as a radially inner unit. In this embodiment, the radially outer unit comprises first and second bearings 4, 5 which are axially spaced apart in relation to each other, and the radially inner bearing comprises first and second bearings 6, 7 which are axially spaced apart in relation to each other. The first and second bearings 4, 5 of the radially outer unit are cylindrical elastomeric bearings, while the first and second bearing 6, 7 of the radially inner unit are plain bearings, also known as sliding bearings. Further, the first elastomeric bearing 4 is fixedly attached to the first sliding bearing 6, and the second elastomeric bearing 5 is fixedly attached to the second sliding bearing 7. The first sliding bearing 6 comprises a first sliding pad 16 which bears on an exterior surface of the shaft 8 in a radial direction and bears against a first mounting flange 11 of the shaft 8 in an axial direction. The second sliding bearing 7 comprises a second sliding pad 17 which bears on the exterior surface of the shaft 8 in the radial direction and bears against a second flange 18 of the shaft in the axial direction.

The radially outer unit is mounted on a hub mounting plate 14 that delimits the hub. The mounting plate comprises one or more openings that will allow an operator to crawl out of the hub into the blade, when the dimensions of the blades allow this. This is possible since the bearing units display an outer diameter that is significantly smaller than the outer diameter of the blade. The first elastomeric bearing 4 is mounted at a first side of the mounting plate 14 and the second elastomeric bearing 5 is mounted at a second side of the mounting plate. By using two bearings spaced apart along the rotational axis 10, the stability of the bearing and the ability of the bearing to withstand large torque loads is increased.

The shaft 8 is fixedly attached to the blade such that the blade rotates with the shaft. In the shown example, the shaft is mounted to a mounting plate 15 in the base of the blade. Also the mounting plate 15 comprises one or more openings that will allow an operator to crawl through the mounting plate. To enable angular adjustment of the blade 9, drive means 20 in the form of e.g. a motor is coupled to the shaft 8. The drive means will rotate the blade during the pitching or stalling of the blade. The drive means may be electrical or hydraulic and will engage with the shaft either on the inner side of the shaft or on the exterior side of the shaft or the flanges, either directly or through a transmission. The force from the drive means may be transferred to the blade by e.g. some kind of belt with or without teeth. A belt drive is more reliable and cheaper than a rack and pinion drive as used in conventional wind turbines, and is also easier to maintain. Further, a rubber belt being somewhat resilient will allow the transmission to withstand larger load peaks without damage.

For blade pitch adjustment in the second and third categories, i.e. oscillating movements of up to 30 degrees and up to 90 degrees respectively, the drive means 20 rotates the shaft 8 by the required amount, and thereby adjusts the blade 9. In this mode of operation, defined as a first mode of operation, an exterior surface of the shaft 8 is in sliding contact with an interior surface of the sliding bearing unit 6, 7. In other words, the shaft 8 is rotatable relative to the sliding bearing unit. In a second mode of operation, the bearing device enables the small oscillating movements of up to 5 degrees for pitch adjustment in the first category The second mode of operation will be described also making reference to FIG. 2, which shows an example of part of the bearing device of FIG. 1.

The bearing device 1 suitably comprises a locking device 19 of some kind. In the depicted example, the locking device 19 is only shown schematically in order to demonstrate the general principle. The locking device 19 may e.g. constitute a disc brake comprising brake pads that engage with the flanges 11 and/or 18 of the shaft 8. Other known types of brakes are also possible to use, depending on the design of the brake device system. The purpose of the locking device is to lock the radially inner unit (sliding bearing unit) 6, 7 and part of the radially outer unit (elastomeric bearing unit) 4, 5 directly to the shaft 8.

In the second mode of operation, the locking device is engaged, meaning that the shaft 8 no longer rotates relative to the first and second sliding bearings 6, 7, since these bearings are locked to the shaft and therefore rotate with the shaft 8. Part of the first and second elastomeric bearings 4, 5 is also locked to the shaft 8 in the second mode of operation, while a further part of the first and second elastomeric bearings is fixedly attached to the hub. The elastomeric bearings permit elastic deformation in an angular direction and thus permit rotation of the shaft 8 and blade 9 relative to the hub 12.

Figure 2:
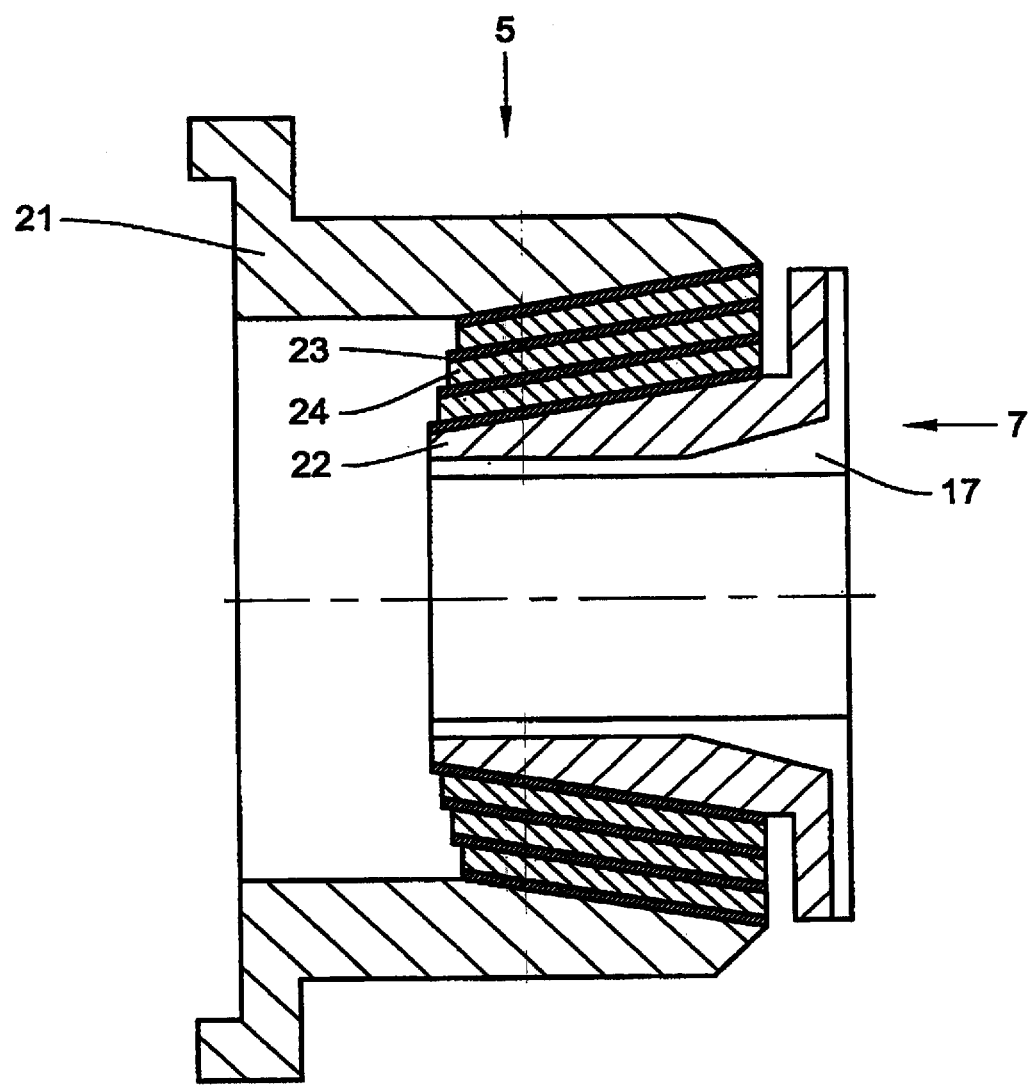
FIG. 2 shows a cut view of part of the bearing device of FIG. 1.

The radially outer unit, i.e. the first and second elastomeric bearings 4, 5, is stiff in a direction parallel with the rotational axis 10, but, as mentioned, is flexible in an angular direction around this axis. Normally, cylindrical elastomeric bearings allow a rotation of up to 10 to 15 degrees. FIG. 2 shows an example of an elastomeric bearing. The example corresponds to the second elastomeric bearing 5 of the radially outer unit, which is mounted to the second sliding bearing 7 of the radially inner unit. The second elastomeric bearing 5 comprises an outer circular attachment member 21 and an inner circular attachment member 22. Between the attachment members, a plurality of conical, tubular supporting elements 23 are provided. These supporting elements are preferably made of metal, although it is possible to use a composite material. The supporting elements are advantageously positioned parallel to one another. Between the supporting elements, there is at least one conical, tubular liner 24. The liner is made of an elastic material, for example rubber or plastic. The supporting elements and the liners are firmly interconnected by, for example, vulcanization.

The outer attachment member 21 of the second elastomeric bearing 5 is fixed to the hub mounting plate 14. The inner attachment member 22 is fixed to the sliding pad 17 of the second sliding bearing 7. Both the inner attachment member 22 and the sliding pad 17 suitably comprise a flange portion that is adapted to be engaged by the locking device. Thus, when the flange portion of the inner attachment member 22 and of the sliding pad 17 are clamped, by the locking device 19 to the second mounting flange 18 of the shaft 8, the inner attachment member 22 of the elastomeric bearing 5 and the sliding pad 17 are both locked to the shaft. As mentioned, the outer attachment member 21 is fixed to the hub. Consequently, when the drive means 20 rotates the shaft, the inner attachment member 22 of the elastomeric bearing 5 is rotated relative to the outer attachment member 21. The relative rotation is enabled by elastic deformation of the liners 24.

It is possible to vary the number of supporting elements and liners in a bearing. The number of supporting elements and liners is determined by the requirements for the bearing arrangement. Fewer supporting elements result in a bearing which has higher torsion rigidity, more supporting elements and liners result in a bearing element with lower torsion rigidity but in which the rotational rigidity, for example, may also be lower. The properties of the elastomeric bearing further depend among others on the thickness of the liners, the material of the liners, the angle of the conical elements and also on the dimensions of the bearing. This type of cylindrical elastomeric bearings is known throughout industry and is used for e.g. general dampening and for bogies on vehicles and trains.

It is often of advantage to preload this type of elastomeric bearings in the axial direction in order to optimize the performance of the bearing and to stiffen it in the axial direction. The preloading of the bearing unit may be done by applying a pressure on the bearing unit in the axial direction by the mounting flanges. Another possibility is to mount the two elastomeric bearings to a tubular element positioned between the elastomeric bearings and the sliding pads of the radially inner unit. In this way, the radially outer unit can be preloaded without imposing additional friction between the radially inner unit and the mounting flanges.

In the second mode of operation, when rotating the blade in the first pitch category, i.e. small oscillatory movements, the locking device will be engaged. The movements of the blade in this category are small, normally up to 5 degrees. When pitching the blade, a reference value corresponding to a specific angular value is given to the drive means. The drive means performs the required angular movement in the required direction and holds the blade in this position until a new angular reference value is given.

In the first mode of operation, when a larger rotation of the blade is to be performed, e.g. when the average wind speed has changed, the locking device 19 is released. This enables the shaft 8 to rotate freely relative to the sliding bearing unit and to the elastomeric bearing unit. The drive means will then rotate the blade with a specific angular value. For a rotation of the blade in the second pitch category, the blade may e.g. be rotated with 20 degrees in order to adjust the blade angle to the actual wind speed. When the new blade position is reached, the locking device may be applied again, and the blade pitch can be finely adjusted with the bearing device in its second mode of operation. A similar principle is applicable when the blade is to be rotated by a larger value, i.e. in the third pitch category. The locking device is released and the blade is rotated to a position having an offset of approximately 90 degrees from a neutral position. In this stall position, the blades will be more or less perpendicular to the wind direction. The locking device may then be applied again so that the drive means does not have to hold the blade in position. Since the elastomeric bearing unit is somewhat rotationally flexible when the drive means are released from the bearing device, the elastomeric bearing unit will additionally provide an angular damping means for the blade, which will dampen the effect from excessive wind gusts acting on the blade.

The bearing device is mounted to a wind turbine in the following way. The radially outer unit 2 is mounted to the hub mounting plate 14 with the first elastomeric bearing 4 on the inside and the second elastomeric bearing 5 on the outside. The blade 9 with the shaft 8 attached to it is then mounted to the bearing by inserting the shaft through a bore of the radially inner unit 3 until the second mounting flange 18 bears on the second sliding pad 17 of the second sliding bearing 7. The first mounting flange 11 is then attached to the shaft such that the first mounting flange 11 abuts the first sliding pad 16 of the first sliding bearing 6. If the radially outer unit 2 is to be preloaded, a pressure corresponding to the required preload is applied to the first mounting flange 11 before the mounting flange is fixed to the shaft.

The advantage of the inventive bearing unit is that one bearing unit performs the small and quick movements of the blade. By using elastomeric bearings for this type of movements, a solution having a more or less unlimited life length and which is maintenance free is obtained. A plain bearing used for this type of movements requires a great deal of maintenance and must be replaced regularly due to wear. In a bearing device according to the invention, plain bearings are used only for the larger and slower rotational movements of the blade, thereby expanding the lifespan of the plain bearings and considerably reducing both wear and maintenance.

The sliding pads 16, 17 of the plain bearing unit may be divided into several segments. The sliding pads are advantageously made from a material having a low friction value and at the same time a high wear resistance. The material may e.g. be a low-friction plastic such as a thermoplastic which may be self-lubricating. The bearing is advantageous provided with some kind of dry lubricant, either embedded in the material or applied to the outside. It is also possible to lubricate the bearing device in a conventional way, i.e. with grease. The corresponding sliding surface of the shaft advantageously displays a higher wear resistance than the sliding pads.

Between the hub 12 and the blade 9, a sealing device 25 is arranged. Since both the radially inner unit 2 and the radially outer unit 3 are positioned at the centre of the blade, relatively close to the rotational axis 10, there is plenty of space at the outer periphery of the blade to arrange a sealing deice. In this way, an improved sealing device can be used. Due to the increased space for the sealing device, a sealing device with improved sealing characteristics and an improved life length is possible to use. On a regular wind turbine, where roller bearings are used, the space for a sealing is very limited. The inventive wind turbine blade pitch bearing device thus allows an improved sealing device to be used.

The invention is not to be regarded as being limited to the embodiments described above, a number of additional variants and modifications being possible within the scope of the subsequent patent claims.

REFERENCE NUMERALS

1: Bearing device
4: First bearing of radially outer unit (first elastomeric bearing)
5: Second bearing of radially outer unit (second elastomeric bearing)
6: First bearing of radially inner unit (first sliding bearing)
7: Second bearing of radially inner unit (second sliding bearing)
8: Blade-rotation shaft
9: Blade
10: Rotational axis of bearing device
11: First mounting flange on shaft
12: Hub
13: Main shaft axis of hub
14: Hub mounting plate
15: Blade mounting plate
16: Inner sliding pad
17: Outer sliding pad
18: Second mounting flange on shaft
19: Locking device
20: Drive means
21: Outer attachment member of elastomeric bearing
22: Inner attachment member of elastomeric bearing
23: Supporting element of elastomeric bearing
24: Liner of elastomeric bearing
25: Sealing device

The invention claimed is:

1. A wind turbine blade pitch bearing device adapted for rotational support of a turbine blade, comprising:
a shaft configured to rotate the turbine blade and configured to support the turbine blade collinearly therewith, the shaft further comprising a flange disposed radially therefrom,
a first bearing unit comprising a first elastomeric bearing and a second elastomeric bearing located over the shaft and axially spaced apart thereon,
a second bearing unit comprising a first slide bearing and a second slide bearing located on the shaft and axially spaced apart thereon, the first bearing unit being mounted coaxially around the second bearing unit such that the first elastomeric bearing is fixed to the first slide bearing and the second elastomeric bearing is fixed to the second slide bearing, and wherein
a locking device configured to clamp the flange of the shaft to secure the first and second bearing units to the shaft and prevent rotation between part of the first bearing unit and the shaft and prevent rotation between the second bearing unit and the shaft,
the wind turbine blade pitch bearing device having first and second modes of operation, the first mode of operation is configured to rotate the pitch of the turbine blade by rotation of the shaft during which time the second bearing unit can slide on the shaft, during the second mode of operation the locking device prevents the first and second bearing units from sliding over the shaft such that rotation of the pitch of the turbine blade is accomplished by elastic deformation in an angular direction between the first and second elastomeric bearings to facilitate fine pitch adjustment of the turbine blade relative to that obtained when the wind turbine blade pitch bearing device is operating in the first mode of operation.

2. The bearing device according to claim 1, further comprising:
a hub having a hub mounting plate, the first and second elastomeric bearings are axially spaced apart in relation to each other by the hub mounting plated located therebetween, and
the first elastomeric bearing and the second elastomeric bearing each having a first portion secured to the shaft via the locking device to prevent rotation relative to the shaft the first elastomeric bearing and the second elastomeric bearing each having a second portion fixed to the hub to allow rotation of the shaft and the turbine blade relative to the hub.

3. The bearing device according to claim 1, wherein the first and second slide bearings have an L-shaped radial cross section.

4. The bearing device according to claim 1, further comprising a drive means configured to rotate the shaft to adjust the pitch of the turbine.

5. The bearing device according to claim 1, wherein the first bearing unit is adapted for rotational movements of up to an angle of 15 degrees.

6. The bearing device according to claim 1, wherein the locking device constitutes a disc brake.

7. The bearing device according to claim 1, wherein the first bearing unit is preloaded with a predefined load.

* * * * *